C. H. THORDARSON.
STORAGE BATTERY POWER AND CHARGING EQUIPMENT.
APPLICATION FILED JUNE 27, 1910.
1,077,175.   Patented Oct. 28, 1913.
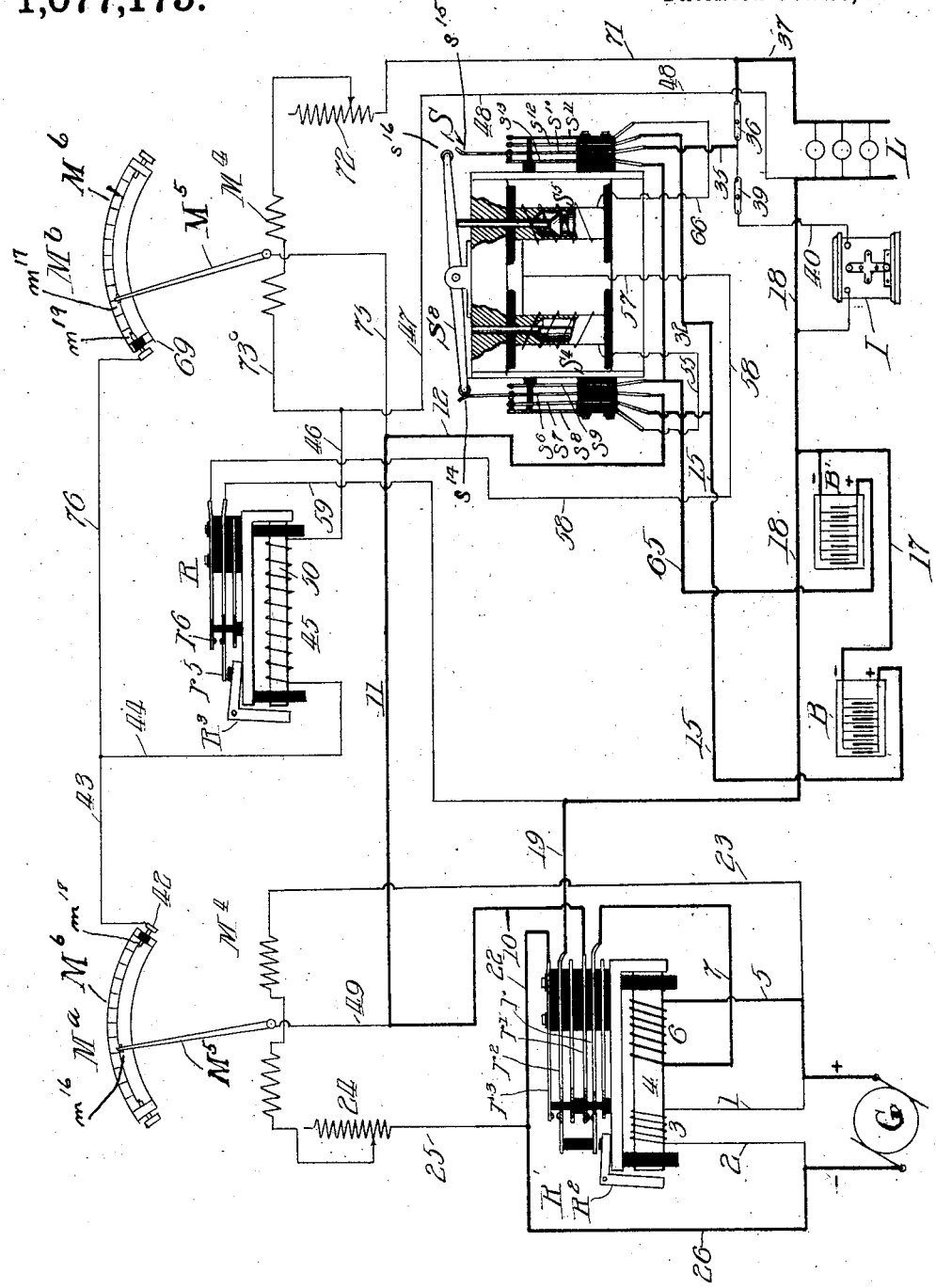

UNITED STATES PATENT OFFICE.

CHESTER H. THORDARSON, OF CHICAGO, ILLINOIS.

STORAGE-BATTERY POWER AND CHARGING EQUIPMENT.

1,077,175.  Specification of Letters Patent.  Patented Oct. 28, 1913.

Application filed June 27, 1910. Serial No. 569,046.

*To all whom it may concern:*

Be it known that I, CHESTER H. THORDARSON, a citizen of the United States, and a resident of Chicago, in the county of Cook and State of Illinois, have invented certain new and useful Improvements in Storage-Battery Power and Charging Equipment; and I do hereby declare that the following is a full, clear, and exact description thereof, reference being had to the accompanying drawings, and to the characters of reference marked thereon, which form a part of this specification.

This invention relates to a storage battery equipment for supplying electrical energy to a load circuit or circuits, and refers more specifically to an apparatus for charging a plurality of storage batteries from a single generator, or other source of electrical energy, so arranged as to alternately charge the batteries and to automatically maintain them at a suitable working potential to furnish the desired power to the load circuit, while avoiding the overcharging of said batteries.

The invention relates also to other features of improvements in apparatus of this character, and the invention consists in the matters hereinafter set forth and more particularly pointed out in the appended claims.

An apparatus embodying my invention embraces, in general terms, two or more secondary or storage batteries adapted to be connected with and to supply current to a load circuit or circuits, a generator for separately charging said batteries and means interposed between the generator and the batteries and between the batteries and the load circuit, arranged to switch the charged battery from the charging circuit to the load circuit, and at the same time to switch the partially discharged battery from the load circuit to the generator circuit, so as to charge the latter battery during the time current is being supplied from the battery last charged. The switching means are placed under the control of the batteries themselves, and may be so arranged as to be actuated both by the high pressure of a battery being charged and by the low pressure of a battery that is supplying current to the load circuit, and in such manner as to prevent the overcharging of a battery being charged, and to prevent too great a fall of potential in the battery supplying current to the load circuit. The arrangement is preferably such that the switching of the batteries from the generator circuit to the load circuit is effected with a small difference of potential, whereby the pressure on the load circuit is maintained fairly constant, so that if the load circuit be an electric light circuit, the lights in said circuit will be maintained at a substantially constant luminosity.

An apparatus embodying my invention is readily adaptable to automobile uses for furnishing current to energize the induction coil of the engine ignition device, and also for lighting the car; and in this use of the apparatus the generator may be connected to and be operated by the car axle, so that the generator is operated when the car is in motion to charge one of the batteries, during which time the other battery is delivering current to the load circuit, including the lighting and induction coil circuits. The apparatus may also be employed to furnish current to the lighting circuits of railway cars, or in other locations where a secondary battery charged by an intermittently operated generator is required to furnish current to a load circuit, both when the generator is operating and when the generator is out of operation.

In the drawings:—The single figure of the drawing is a diagram illustrating the various parts of the apparatus and the manner of electrically connecting the various parts of the apparatus.

As shown in said drawings, G designates a generator adapted to be operated more or less continuously, as by being geared to one of the axles of a vehicle.

B, B' designate storage or secondary batteries which are alternately charged by said generator.

L designates an electric lighting circuit supplied with current from the storage battery circuits and I designates an induction coil also supplied with current from the storage battery circuits, and which, in automobile use, constitutes part of the ignition device of the explosive engine.

S designates, as a whole, a reversing switch arranged to alternately switch the batteries B, B' into the generator circuit, and to switch the load circuit from one battery to the other.

M$^a$ M$^b$ designate, as a whole, a double, switch controlling meter which controls the operation of the switch S. The said switch S is divided into two sides or parts, one side of which operates to switch the batteries B, B' alternately into the generator circuit and the other side of which operates to alternately switch the load circuit from one battery to the other, or from a battery of lower potential to a battery of higher potential. The meter is divided into two like superposed parts, or two separate meters, each of which is controlled by either of the batteries to actuate the reversing switch upon a predetermined maximum potential of either battery, and each of which is in a like manner controlled by either of the batteries to actuate the reversing switch upon a predetermined minimum potential of either battery. The actuation of the reversing switch through the control of either of the meters has the effect of switching a battery of higher potential from the generator or charging circuit to the load circuit and to switch the other battery from the load circuit to the charging circuit.

R designates, as a whole, a relay switch arranged in branch circuits with the indicator arms of the meters, and adapted to be closed by either of said arms when the latter reaches one limit of movement on the meter dial. The closing of said relay switch, which occurs, either when one of the batteries is charged to a predetermined maximum potential, or when the potential of the other battery is reduced to a predetermined minimum, establishes a branch circuit, including the generator, or one of the batteries, which operates the switch S to reverse the batteries with respect to the charging and load circuits, in the manner described.

R' designates as a whole an automatic relay switch which operates to open and close both sides of the generator circuit. This relay switch is normally open at both sides, and is automatically closed, when the potential of the generator rises to a given maximum, to switch or connect the generator with the charging circuit to charge that one of the batteries, determined by the position of the battery reversing switch S. When the potential of the generator is reduced to a certain minimum, the relay switch R' is operated to automatically disconnect the generator from the battery charging circuit.

The reversing switch S may be made like that shown in my prior U. S. Letters Patent, No. 1,000,052, dated August 8, 1911, and is herein so diagrammatically indicated. It comprises the coils $S^4$, $S^5$ in which operate the reciprocable plungers $s^2$, $s^3$, in the manner of a solenoid, as set forth in my aforesaid prior patent, and a centrally pivoted switch arm $S^8$ pivoted between said plungers and adapted to be acted upon alternately by said plungers, as the coils $S^4$, $S^5$ are alternately energized, to swing first one end of the switch arm upwardly and then the other.

Arranged at the opposite sides of the switch structure and insulated therefrom and from each other, are two sets of spring switch terminals with four springs in each set, one set being designated by $s^6$, $s^7$, $s^8$ and $s^9$ and the other set being designated by $s^{10}$, $s^{11}$, $s^{12}$ and $s^{13}$. The central or master terminals $s^6$, $s^{10}$ of the sets are extended above the other springs and are provided with contact pieces $s^{14}$, $s^{15}$ adapted for contact by the rollers $s^{16}$, $s^{16}$ at the ends of the switch arm $S^8$. The tendency of the center or master springs, when unrestrained, is to spring inwardly, with their points in contact with the points of the inner springs of the sets, this position being shown at the right hand side of Fig. 1. The engagement of the bearing rollers $s^{16}$ of the switch arm $S^8$ with the contact pieces of the center springs or master terminals forces said center terminals outwardly with their contact points separated from the contact points of the inner terminals and in electrical contact with the contact points of the outer spring terminals, this being the position of the terminals at the left hand side of Fig. 1. The shape of the contact pieces $s^{14}$, $s^{15}$ is such as to lock the switch arm into either of the positions into which it is thrown. When either of the coils $S^4$, $S^5$ is energized, it draws its plunger $s^2$, $s^3$ upwardly and the plunger strikes the pivoted switch arm $S^8$ and throws it over to one limit of its movement, disengaging one of the central switch springs and engaging the other so as to reverse the positions of the switch.

The meters $M^a$, $M^b$ may be, and are herein diagrammatically indicated as of the same construction as that shown in my prior U. S. Letters Patent No. 1,016,303, dated February 16, 1912. Each meter embraces in its construction a coil $M^4$ and a swinging arm $M^5$ which traverses an arcuate graduated scale or dial $M^6$. The meter arms may carry contact points $m^{16}$, $m^{17}$ which are adapted, when said arms reach the limit of their swing, to contact with fixed contact points $m^{18}$, $m^{19}$ at the ends of said scales $M^6$. The meter arms $M^5$, $M^5$ are grounded to the meter frame, and when the contact points of the arms engage the stationary contact points $m^{18}$, $m^{19}$, circuits are closed, as will hereinafter appear. It will be understood that the circuit is thus closed by one of said meter recording arms when said arm has reached the highest point of the scale, which indicates a maximum potential in its associated battery, and that the other arm closes its circuit when said arm has reached the lowest point on its scale, which indicates a selected minimum potential of its associated battery.

Referring now to Fig. 1 and to the operation of the various apparatus connected as therein shown, it will be observed that the generator G is just starting, as indicated on the meter $M^a$, but has not generated sufficient voltage to close the relay $R'$. The current flows through said meter at this time from positive side of generator through wire 23, meter coil $M^4$, variable resistance 24 and back to the negative side of the generator by the wire 25 and wire 26. Current also flows at this time from the positive side of the generator through wire 1, coil 3 on the core 4 of relay $R'$ and back by wire 2 to the negative side of the generator. The latter circuit energizes said core 4 of the relay so as to draw up its swinging armature $R^2$ as soon as the generator has attained the desired speed. When the armature $R^2$ is thus drawn up the spring terminals $r$, $r'$ and the terminals $r^2$, $r^3$ are closed together. The closing of said terminals establishes the charging circuit, which is thus closed on both its positive and negative sides, from the generator through wire 5, coil 6 on the core 4, (which latter coil is so wound on the core as to increase the magnetism of the core) wire 7, terminals $r$, $r'$, (which are at this time closed) wires 10, 11 and 12, spring terminals $s^6$ and $s^7$ of the switch S, and wire 15 to the positive side of the battery B. From the negative side of the battery B the circuit is completed through wires 17, 18 and 19 and spring terminals $r^2$, $r^3$ of relay $R'$, and thence by wires 22 and 26 to the negative side of the generator. With this adjustment of the parts the current from the generator is charging battery B.

As the battery is gradually charged the meter $M^a$, which is connected in multiple with the charging circuit, as hereinbefore described, gradually registers the rise of battery potential until the contact $m^{16}$ of arm $M^5$ of said meter touches contact $m^{18}$. Thereupon a branch circuit will be established to operate the switch S to switch battery B from the charging circuit to the load circuit, and to switch the battery $B'$ from the load circuit to the charging circuit. This branch circuit may be traced as follows: From wire 11 of the main charging circuit through wire 49, meter arm $M^5$, contacts $m^{16}$, $m^{18}$, wires 43 and 44 to coil 45 of relay R, thence by wires 46, 47 and 48 to the return wire 18. The flow of current through coil 45 energizes the core 50 of the relay R which draws up its swinging armature $R^3$ and closes the spring terminals $r^5$, $r^6$ to establish a circuit which may be traced as follows: From wire 11 of the main charging circuit through wire 12, spring terminals $s^6$, $s^7$ and $s^8$ of switch S, wire 55, coil $S^4$, wires 57 and 58, spring terminals $r^6$, $r^5$ (which are now closed) and wire 59 back to the return wire 19. Current flowing through this circuit, energizes the coil $S^4$ and operates the plunger $s^2$ to throw the switch arm $S^8$ away from the master spring terminal $s^6$, allowing the latter to spring back to normal position in contact with the spring terminal $s^9$, and at the same time allowing the spring terminal $s^7$ to separate from the terminals $s^6$ and $s^8$. When said switch arm is thus thrown over, it engages the master spring terminal $s^{10}$ at the other or load side of the switch and swings the same out of contact with the terminal $s^{13}$ and into contact with the terminal $s^{12}$, pressing the latter into contact with the terminal $s^{11}$. This operation of the switch serves to switch the charged battery B from the charging to the load circuit (through connections which will hereinafter be described) and to bring the generator into circuit with the partially discharged battery $B'$ theretofore supplying the load circuit. After the switch arm $S^8$ has been thrown over, and terminal $s^6$ has been brought into contact with terminal $s^9$, the charging current from the generator flows through terminals $s^6$ and $s^9$ and wire 65 to the positive side of the battery $B'$; the return of the battery being through wire 18, whereby the battery $B'$ begins to be charged. Immediately the battery $B'$ of lower potential is switched into the generator circuit, the potential of the generator will fall somewhat, whereby the meter arm $M^5$ will back away from the contact $m^{18}$ and deënergize the relay R and open the switch controlling relay circuit between the terminals $r^5$, $r^6$.

The relay R and its branch circuit are interposed between the make and break contacts of the meter $M^a$ and the coils of the reversing switch S so that said meter contacts may be closed on a light circuit to operate the reversing switch instead of closing on the heavier circuit of the reversing switch, and thereby avoid tendency of the contact points on the relatively light parts of the meter sticking.

When battery $B'$ receives a predetermined charge the contact $m^{16}$ of the arm $M^5$ of the meter $M^a$, which gradually indicates the rise of potential of battery $B'$, engages contact $m^{18}$ and operates relay R in the manner before described to close the branch circuit of coil $S^5$ of the reversing switch S and energize said coil to actuate its plunger $s^3$ in a manner to throw the switch arm back to the former position, or that indicated in the drawings. The closing of the branch circuit of the coil $S^5$ occurs at a time when the master spring terminal $s^{10}$ of switch S is in contact with switch terminals $s^{11}$ and $s^{12}$. This circuit is closed through wire 15, leading from battery B, spring terminals $s^{12}$ and $s^{11}$, wire 66, coil $S^5$, wires 57 and 58, spring terminals 26 and 27 and wire 59 to return wire 19.

Each time the switch S is operated to cut a battery of higher potential out of the charging circuit, it connects that battery with the load circuit, and switches the partially discharged battery theretofore connected in the load circuit into the charging circuit. Assuming, for instance, that battery B is connected in the charging circuit, and that battery B' is connected in the load circuit to supply current thereto, it will be seen that current flows from battery B' through wire 65, spring terminals $s^{13}$, $s^{10}$, wire 35, switch 36 and wire 37 to the positive side of the lighting circuit, the negative side of which is connected to the negative side of the battery by the return wire 18. The said wire 35 is also connected, through the switch 39 and wire 40, to one side of the induction coil I, said coil being connected at its other side to the return wire 18. So long as these conditions exist, battery B' is supplying current to the load circuit.

The potential of the battery connected at any given time to the load circuit is indicated by the meter $M^b$. This meter is included in a branch circuit that may be traced from wires 35, (connectible to positive sides of the batteries) through wire 71, the variable resistance 72, the coil $M^4$ of meter $M^b$ and back to the negative or return wire 18 by wires 73, 47 and 48. The meter $M^b$ is so adjusted that when the battery B' falls to a predetermined minimum potential, the meter arm $M^5$, registering the fall of the potential, engages the contact $m^{19}$, whereupon a branch circuit is closed through relay R as follows: from positive side of the circuit by wire 11, through wire 75, meter arm $M^5$, contact $m^{19}$, wires 76 and 44, coil 45 and wires 46, 47 and 48 to return wire 18. Relay R is in this manner operated to close the relay circuit between terminals $r^5$, $r^6$ to operate the switch S to switch the partially discharged battery into the charging circuit, and to simultaneously switch the charging battery into the load circuit.

It will thus be evident that when a battery is operating under a predetermined potential, it will automatically cut out the battery from the charging circuit and connect it to the load circuit, and will at the same time automatically switch the partially discharged battery from the load circuit to the charging circuit. The difference between the maximum and minimum potentials at which the batteries will thus operate to automatically switch the charged battery from the charging circuit to the load circuit and the partially discharged battery from the load circuit to the charging circuit is relatively small. That is to say, the meters $M^a$, $M^b$ may be so adjusted that the differences in potential at which the batteries will operate to reverse their positions in the charging and load circuit may be so small as to manifest itself but slightly or with but little effect on the lamps of the lighting circuit.

The variable resistances 24 and 72 are provided to accurately adjust the meters $M^a$ and $M^b$ to the batteries when the apparatus is originally installed, and also to adjust the meters to the batteries after a period of use and when the age of the batteries begins to affect the plates thereof. The switches 36 and 39 permit the lighting circuit and the induction coil circuit to be separately cut out of the battery circuit when desired.

The coil 6 of the core 4 of the relay R', arranged between the generator and the battery being charged, is so wound about the core, relatively to the direction of winding of the coil 3, as to assist the coil 3 to magnetize the core 4 to draw up its armature $R^2$ when current is flowing in the proper direction therethrough, but to neutralize the effect of said coil 3 when current through the coil 6 is reversed. Therefore, when the generator slows up, and there is a tendency for the current to flow backwardly through the charging circuit into the generator, the reversal of the current through the coil 6 has the effect of hastening the de-magnetization of the relay to quickly release the armature $R^2$ to open the charging circuit. In this manner leakage of current from a charged battery back to the generator is avoided when the generator slows up.

I claim as my invention:—

1. A plurality of storage batteries with a charging circuit and a load circuit, having switching means for switching one battery to the charging circuit and simultaneously switching another battery to the load circuit, and independently acting means directly impressed by the potential of the batteries, one operating the switching means upon a predetermined maximum potential of a battery in the charging circuit for switching the latter battery to the load circuit, and the other likewise operating the switching means upon a predetermined minimum potential of a discharging battery for switching the partially discharged battery from the load circuit to the charging circuit.

2. A plurality of storage batteries with a charging circuit and a load circuit, having means for separately connecting one battery to the charging circuit and another battery to the load circuit, means controlled by the rise of potential of the battery in the charging circuit for switching the latter battery to the load circuit, and the partially discharged battery from the load circuit to the charging circuit, and means controlled by the fall of potential of the battery in the load circuit for switching the latter battery into the charging circuit and for switching a charged battery from the charging circuit to the load circuit.

3. A plurality of storage batteries, a charging circuit and a load circuit, combined with a switch mechanism connected to the storage batteries and to the charging and load circuits to alternately switch the batteries from and to the charging and load circuits, and switch controlling devices connected in branch circuits of the charging and load circuits and each adapted to be independently actuated by variations of potential of the batteries to control its branch circuit, for the purpose set forth.

4. A plurality of storage batteries, a charging circuit and a load circuit, combined with a switch mechanism connected to the batteries and to the charging and load circuits to alternately switch the batteries from and to the charging and load circuits, and meters, one responsive to the charging circuit and the other to the load circuit adapted each to independently close a circuit to actuate said switch mechanism.

5. A plurality of storage batteries, a charging circuit and a load circuit, combined with a switch mechanism connected to the batteries and to the charging and load circuits to alternately switch the batteries from the charging to the load circuit and vice versa, and meters, one responsive to and operable upon a minimum potential of the load circuit, and the other responsive to and operable upon a maximum potential of the charging circuit, for operating said switch mechanism.

6. A plurality of storage batteries, a charging circuit and a load circuit, combined with a switch mechanism connected to the batteries and to the charging and load circuits to alternately switch the batteries from the charging to the load circuit and vice versa, and meters, one responsive to and operable upon a minimum potential of the load circuit, and the other responsive to and operable upon a maximum potential of the charging circuit, for operating said switch mechanism, each of said meters being connected in a branch circuit that is bridged across the main circuit which it controls.

7. A plurality of storage batteries, a charging circuit and a load circuit, combined with a switch mechanism connected to the batteries and to the charging and load circuits to alternately switch the batteries from the charging to the load circuit and vice versa and meters, one responsive to and operable upon a minimum potential of the load circuit, and the other responsive to and operable upon a maximum potential of the charging circuit, for operating said switch mechanism, each of said meters being connected in a branch circuit that is bridged across the main circuit which it controls, and each meter embracing a movable contact arm and a fixed contact engaged by the arm to close the branch circuit.

8. A plurality of storage batteries, a charging circuit and a load circuit, combined with a reversing switch connected to the batteries and to the charging and load circuits to alternately switch the batteries from and to the charging and load circuits, said switch embracing two coils connected in a divided switch controlling circuit and two alternately operable controlling devices for the latter circuit, responsive, one to variations of potential of the charging circuit and the other to variations of potential of the load circuit, for separately closing the controlling circuit alternately through said coils to operate said switch.

9. A plurality of storage batteries, a charging circuit and a load circuit, combined with a reversing switch connected to the batteries and to the charging and load circuits to alternately switch the batteries from and to the charging and load circuits, said switch embracing two coils connected in a divided switch controlling circuit, a relay for controlling the latter circuit and meters connected in the charging and load circuits, and each responsive to variations of potential in its circuit, for separately closing said relay to close the controlling circuit through said coils in a manner to operate said switch.

10. A plurality of storage batteries, a charging circuit, a load circuit, with means for separately switching them from the load to the charging circuit, and vice versa, combined with two separately and independently operable devices connected one in branch with the charging circuit and operable upon a predetermined maximum of one of the batteries to cut said battery out of the charging circuit and connect it into the load circuit, and the other in branch with the load circuit and operable upon a predetermined minimum of one of the batteries to cut said battery out of the load circuit and connect it into the charging circuit.

11. A plurality of storage batteries, a charging circuit and a load circuit, combined with a switch mechanism connected to the batteries and to the charging and load circuits to alternately switch each battery from and to the charging and load circuits, and separately acting, combined current measuring devices and switches connected one in the charging circuit and the other in the load circuit and acting alternately to operate said switch mechanism, one of said measuring and switching devices being operated upon a predetermined maximum potential of its circuit and the other being operated upon a predetermined minimum potential of its circuit.

12. A plurality of storage batteries, a charging circuit and a load circuit, combined with a reversing switch, embracing two sets of switch terminals, two of the terminals in each set being connected, one with one battery and the other with the other battery, and a third terminal in each set, one of the latter terminals being connected with the charging circuit and the other with the load circuit, and switch reversing means acting alternately on the latter terminals of said sets.

13. A plurality of storage batteries, a charging circuit and a load circuit, combined with a reversing switch, embracing two sets of switch terminals, two of the terminals in each set being connected, one with one battery and the other with the other battery, and a third terminal in each set, one of the latter terminals being connected with the charging circuit and the other with the load circuit, and switch reversing means embracing a reversible switch arm arranged to act alternately on said sets of terminals, two coils to alternately actuate said switch arm, and a divided, switch controlling circuit in which said coils are included and having means to close the same, said latter circuit embracing two terminals, between which said controlling circuit is alternately opened and closed by said reversible switch arm.

In testimony, that I claim the foregoing as my invention I affix my signature in the presence of two witnesses, this 2nd day of June A. D. 1910.

CHESTER H. THORDARSON.

Witnesses:
  W. L. HALL,
  WILLIAM GOLDBERGER.